United States Patent [19]
Kobayashi et al.

[11] Patent Number: 5,362,026
[45] Date of Patent: Nov. 8, 1994

[54] WATER FLOW CONTROL SYSTEM

[75] Inventors: Hiroshi Kobayashi; Ryosuke Hayashi; Shoji Inokuchi; Yukihiro Muroya, all of Kita-kyushu, Japan

[73] Assignee: Toto Ltd., Kita-kyushu, Japan

[21] Appl. No.: 220,624

[22] Filed: Mar. 31, 1994

Related U.S. Application Data

[62] Division of Ser. No. 76,887, Jun. 15, 1993, Pat. No. 5,341,839.

[30] Foreign Application Priority Data

Jun. 15, 1992 [JP] Japan ................. 4-180400

[51] Int. Cl.$^5$ ............................................. F16K 31/40
[52] U.S. Cl. ...................................... 251/30.02; 4/623; 137/505.13; 137/613; 251/30.05
[58] Field of Search .............. 137/613, 614.19, 505.13; 251/30.02, 30.05; 4/623

[56] References Cited

U.S. PATENT DOCUMENTS

| | | | |
|---|---|---|---|
| 2,638,927 | 5/1953 | Walker | 251/30.05 |
| 2,821,206 | 1/1958 | Holmes | 137/614.19 X |
| 3,265,350 | 8/1966 | Yount et al. | 251/30.05 |
| 3,282,552 | 11/1966 | Sommese | 251/30.05 X |
| 3,306,570 | 2/1967 | Cooksley | 251/30.05 |
| 3,496,951 | 2/1970 | Stang et al. | 137/614.19 X |
| 4,201,362 | 5/1980 | Nishimi et al. | 251/30.05 X |
| 4,742,583 | 5/1988 | Yoshida | |
| 4,793,588 | 12/1988 | Laverty | 251/30.05 X |
| 4,901,758 | 2/1990 | Cook et al. | 251/30.05 X |
| 5,052,060 | 10/1991 | Makita | |
| 5,127,436 | 7/1992 | Campion et al. | 137/614.19 X |

FOREIGN PATENT DOCUMENTS

| | | |
|---|---|---|
| 57-27045 | 6/1982 | Japan . |
| 59-206911 | 11/1984 | Japan . |

*Primary Examiner*—Stephen M. Hepperle
*Attorney, Agent, or Firm*—Fish & Richardson

[57] ABSTRACT

A battery-operated flushing system (10) comprises a flushing valve (34) of the pilot-operated self-closing type having a pressure chamber (46) connected to a pilot conduit (52) controlled by a solenoid valve (50) of the non-latching type. A pressure control valve (48) is disposed between the pressure chamber (46) and the solenoid valve (50) for limiting the static water pressure applied to the solenoid valve (50) when the solenoid valve is closed. The provision for the pressure control valve (48) enables considerable reduction in the power consumption required to lift a solenoid valve plunger against the action of the static hydraulic pressure. Once the plunger is lifted, the non-latching type solenoid valve is energized with a reduced electric current sufficient to hold the valve in its open position. In total, energy consumption per cycle of operation is reduced. Use of the non-latching type solenoid valve permits to avoid malfunction inherently involved in the solenoid valves of the latching type. Various other embodiments are also disclosed.

7 Claims, 13 Drawing Sheets

WATER FLOW CONTROL SYSTEM

This application is a division of U.S. application Ser. No. 08/076,887 filed Jun. 15, 1993, now U.S. Pat. No. 5,341,839.

BACKGROUND OF THE INVENTION

1. Field of the Invention

The present invention relates to water flow control systems such as faucets and flushing systems and, more particularly, is concerned with battery-operated flow control systems wherein flow of water is controlled by solenoid valves powered by batteries such as dry cells.

2. Description of the Prior Art

Battery-operated flow control systems, such as automatic flushing systems for toilets or urinals and automatic faucets for use in wash basins and sinks, have been widely used because of the advantage that they can be readily installed in houses or buildings without requiring electric wiring to the commercial power lines. The conventional battery-operated flow control systems are generally provided with a flow control valve of the pilot-operated self-closing type having a pressure chamber defined by a piston valve or diaphragm valve and connected to a pilot passage which is controlled by a battery-operated solenoid valve serving as a pilot valve. By opening the solenoid valve, the pressure in the pressure chamber is released to trigger opening movement of the piston or diaphragm valve. When the solenoid valve is closed to terminate pressure release, water pressure is gradually resumed in the pressure chamber to close the piston or diaphragm valve. In this manner, the use of a solenoid valve in combination with a pilot-operated self-closing valve enables the use of the battery power to control the flow of water supplied from a source of water having a water head of as high as 2–10 $kgf/cm^2$. As is well-known in the art, the pressure chamber also serves to shut-off the high pressure water flow by making use of the pressure of water supply as well as to retard closing movement of the piston or diaphragm valve in order to prevent water hammering.

An important designing requirement for such battery-operated flow control systems is to achieve power saving to ensure that the batteries outlast without replacement sufficiently long time of use, preferably over more than 3 years.

In order to operate the solenoid valve by a limited electric power available with the batteries, it has been customary to use a solenoid valve of the latching type which is designed to hold or "latch" a plunger thereof in its open position by the action of a permanent magnet, as disclosed, for example, in U.S. Pat. No. 4,742,583. In the latching type solenoid valve, the solenoid may be energized only when the opening and closing movement of the plunger is initiated, with the plunger being maintained in its open position without requiring power consumption as it is latched by the permanent magnet. Therefore, the solenoid valves of the latching type are advantageous in reducing energy consumption of the batteries and in providing an extended service life thereof.

However, one of the disadvantages associated with the latching type solenoid valves is that they are costly to manufacture as compared with the general-purpose solenoid valves of the non-latching type.

Another disadvantage of the solenoid valves of the latching type resides in the lack of commonality with the general-purpose solenoid valves of the non-latching type. Cost reduction is barred, since the stock of component parts therefor must be stored and administered additionally and electric control devices therefor must be designed and assembled separately.

A more significant problem associated with the latching type solenoid valve is related to its malfunction which inherently occurs from time to time in the solenoid valves of this type.

More specifically, and referring to FIGS. 1A–1F, a latching type solenoid valve may typically be comprised of a plunger 3 adapted to open and close a port 2 in a valve seat 1, a yoke 4, a magnetic pole piece 5, a solenoid 6 and a permanent magnet segment 7. In certain occasions, a return spring, not shown, may be provided to urge the plunger 3 against the valve seat.

In the rest or closed position shown in FIG. 1A, the fixed magnetic gap Dx being present between the yoke and the plunger is shorter than the variable magnetic gap Dv formed between the pole piece and the plunger, so that the magnetic flux developed by the permanent magnet is caused to pass a shortened magnetic path shown by the arrows of solid lines. In this position, the plunger is under the action of the gravity and the hydraulic pressure acting on the effective cross-sectional area of the port 2, plus the spring force of the return spiring if this is provided.

When the solenoid 6 is energized to generate a magnetic flux passing through a magnetic circuit indicated in FIG. 1B by the arrows of broken lines, the magnetic pole piece and the plunger will be magnetized causing the plunger to be magnetically attracted toward the pole piece. The plunger will begin to move when at any point of time the magnetic attractive force acting on the plunger overcomes the gravity and the hydraulic force acting on the plunger, plus the spring force if any. As the plunger is moved and lifted through such a sufficient stroke that the variable magnetic gap Dv becomes shorter than the fixed gap Dx, the magnetic flux of the permanent magnet will be switched over from the short magnetic path shown by the solid line arrows in FIG. 1B to the extended magnetic path passing through the magnetic pole piece as shown in FIG. 1C. At this moment, the pole piece and the plunger will be magnetized by the magnetic flux of the permanent magnet and will be attracted with each other to "latch" the plunger against the pole piece, so that the solenoid valve will be kept in its open position even if the power supply to the solenoid is turned off.

When the solenoid valve is to be closed, an electric current must be supplied to the solenoid in the reverse direction so that a magnetic flux path having an opposite polarity to that of the extended path of the permanent magnet is developed as shown in FIG. 1D by the broken line arrows. As the magnetic force of the solenoid overcomes the permanent magnet force, the plunger will begin to descend to initiate its downward stroke. When the plunger has moved sufficiently to permit the variable magnetic gap Dv to become greater than the fixed gap Dx, the magnetic circuit developed by the permanent magnet will be switched over from the extended path indicated by the solid line arrows in FIG. 1D to the short path designated by the solid line arrows in FIG. 1E. If, at this point of time, the energization of the solenoid is continued, then the plunger will be subjected to the magnetic attractive force of the solenoid tending to attract the plunger toward the pole piece. This will hinder further downward movement of the plunger and prevent closure of the solenoid valve. Accordingly, the energization of the solenoid with the reverse electric current must be continued during such an enough period that the magnetic force due to the permanent magnet is overcome to initiate the downward stroke of the plunger, but, on the other hand, must be terminated upon completion of switching over of the magnetic path of the permanent magnet. Otherwise, the solenoid valve would fail to close.

As the plunger continues its downward stroke until it strikes against the valve seat as shown in FIG. 1E, the plunger will bounce and will be more or less repelled as shown in FIG. 1F. If the amount of the plunger bounce is large enough to cause the variable magnetic gap Dv to become smaller than the fixed gap Dx, the magnetic path of the permanent magnet will be changed over from that shown by the solid line arrows in FIG. 1E to that indicated by the arrows in FIG. 1F, thereby tending to attract the plunger toward the pole piece, whereby the plunger will again be latched in its open position.

In this manner, the latching type solenoid valve inherently involves the possibility of malfunction due to the plunger bouncing. Furthermore, it requires precise control of timing and duration of energization which is often difficult to achieve. Once the solenoid valve malfunction occurs for any of these reasons, it will fail to trigger closing movement of the self-closing valve so that water is inadvertently allowed to issue. This would lead to the loss of water resources.

SUMMARY OF THE INVENTION

Accordingly, the primary object of the present invention is to provide a water flow control system which contributes to the conservation of water resources.

Another object of the invention is to provide a battery-operated water flow control system having an improved reliability of operation.

A still another object of the invention is to provide a battery-operated water flow control system which is free from malfunction of solenoid valve.

A further object of the invention is to provide a battery-operated flow control system which is operable for an extended period of time without resort to the use of a latching type solenoid valve.

Another object of the invention is to provide a water flow control system which may be manufactured at low costs.

Another object of the invention is to provide a water flow control system which is easy to manufacture.

Another object of the invention is to provide a water flow control system which may be manufactured by using standard component parts having commonality with other flow control systems.

In its simplest form, the water flow control system according to the present invention comprises a solenoid valve of the non-latching type which is adapted to control the flow of water through a water conduit and which, in turn, is controlled by an electric control unit. The system further comprises a pressure control valve which is disposed in the conduit upstream of the solenoid valve and which is adapted to reduce the incoming primary water pressure and to deliver to the solenoid valve a flow of water under a secondary pressure having a predetermined pressure level substantially lower than the primary pressure. The feature of the pressure control valve is that it not only controls the dynamic pressure of water flow but also limits the static pressure applied to the solenoid valve located downstream thereof. As in this way the static water pressure applied to the non-latching type solenoid valve is reduced, the plunger of the solenoid valve will be subjected to a limited hydraulic pressure in the closed position of the solenoid valve. Therefore, when the solenoid valve is to be opened, the plunger thereof may readily be pulled up away from its associated valve seat by a limited magnetic attractive force. As a result, the energy required to bring the solenoid valve from its closed position into its open position is limited, so that the energy consumption of the battery at the time of valve opening is reduced.

Generally, water head of a water supply system may vary from 2 kgf/cm$^2$ to as high as 10 kgf/cm$^2$. In the case that water flow is to be controlled by a solenoid valve, a plunger of the solenoid valve in its closed position will therefore be subjected to a substantial water pressure which acts to urge the plunger against the valve seat. When the solenoid valve is to be opened, the plunger must be pulled up against the action of such a high hydraulic pressure, so that it will be necessary to energize the solenoid with a substantially high electric power. It will be understood, therefore, that, by reducing according to the invention the static pressure of water supply to 1 kgf/cm$^2$, for example, the plunger of the solenoid valve can readily be raised against the action of the hydraulic pressure with a limited electric power, so that considerable power saving can be achieved at the time of valve opening.

Once the solenoid valve of the non-latching type has been opened, the electric control unit energizes the solenoid with an electric current much lower than that supplied at the time of valve opening, thereby to keep the plunger in its open position. This is possible because it will suffice to hold the plunger only against the action of the gravity, in contrast to initiation of valve opening wherein the hydraulic force and the inertia of the plunger must be overcome.

As, in this manner, both (1) the energy consumption required at the time of valve opening to pull the plunger from its closed position up to its open position and (2) the energy consumption required during subsequent stage to hold the plunger in its open position are reduced, the total energy consumption per cycle of operation of the solenoid valve can be minimized. Accordingly, while using the solenoid valve of the non-latching type, the flow control system according to the invention may be operated for an extended period of time without requiring replacement of the batteries.

Preferably, the solenoid valve is provided with a movable ferromagnetic member for short-circuiting the fixed magnetic gap formed between the plunger and the yoke. When the solenoid valve is brought in its open position, the movable member forms a part of the magnetic path so that the solenoid valve can be maintained in its open position with a lower electric power.

In a preferred form of the invention, the pressure control valve includes a housing having a water passage and a valve seat. A spring-biased movable closure member is provided downstream of the valve seat to cooperate with the valve seat. A pressure receptive member coupled to the closure member is arranged upstream of the valve seat and is adapted to receive the primary pressure. The closure member and the pressure receptive member are designed and arranged in such a manner that the hydraulic forces acting thereon due to the primary pressure are substantially counterbalanced. The movable closure member is responsive to the secondary pressure which biases the closure member toward the valve seat. With this arrangement, the pressure control valve can be made especially compact. It operates to reduce the incoming primary water pressure to a secondary pressure having a pressure level which is dictated by the spring force of the bias spring.

Preferably, the movable closure member comprises a resilient sealing member engageable with the valve seat. The resilient sealing member has such a sufficient elasticity enough to ensure that it is resiliently compressed against the valve seat with increasing degree of elastic deformation as the secondary pressure downstream of the valve seat is increased. As the secondary pressure increases, the resilient sealing member will be compressed until the hydraulic force acting on the closure member due to the secondary pressure is counterbalanced with the sum of the spring force exerted on the closure member by the bias spring and the force of elastic deformation exerted on the closure member by resilient compression of the sealing member. At this moment, the sealing member under compression tightly engages with the valve seat to fluid tightly seal the valve seat. As a result, the pressure control valve is able to shut off the primary pressure with a high degree of sealing capability so that any subsequent pressure rise in the static pressure downstream of the valve seat is substantially prevented.

In another form of the invention, there is provided a battery-operated water flow control system comprising a pilot-operated self-closing valve having a pilot-operated pressure chamber to which a pilot passage is connected. The pilot passage is controlled by a battery-operated solenoid valve of the non-latching type which, in turn, is controlled by a control unit. Disposed in the pilot passage between the pressure chamber and the solenoid valve is a pressure control valve adapted to limit the static water pressure applied from the pressure chamber to the solenoid valve when the solenoid valve is closed. The electric control unit energizes the solenoid valve with an electric current having a first intensity when the opening movement of the solenoid valve is to be initiated and energizes the solenoid valve with an electric current having a second intensity lower than the first intensity when the solenoid valve is maintained in its open state.

In still another form of the invention, there is provided a flushing system for toilets or urinals. The system comprises a flushing valve of the pilot-operated self-closing type having a pressure chamber connected to a pilot passage controlled by a battery-operated solenoid valve of the non-latching type. A pressure control valve is disposed in the pilot passage between the pressure chamber and the solenoid valve for limiting the static water pressure applied from the pressure chamber to the solenoid valve when the solenoid valve is closed. The electric control unit energizes the solenoid valve with a higher electric current when the opening movement of the solenoid valve is to be initiated but energizes the solenoid valve with a lower electric current when the solenoid valve is maintained in its open state.

Preferably, the flushing system further comprises pressure sensor for monitoring the static water pressure applied to the solenoid valve. The electric control unit responds to the pressure sensor and energizes the solenoid valve for a predetermined period of time whenever the static pressure exceeds a predetermined pressure level. As a result, the secondary static pressure is reset and resumes the predetermined initial level.

Resetting of the static pressure may be made by the control unit which operates to periodically energize the solenoid valve for a predetermined period of time.

In another form of the invention, there is provided an automatic flushing system for a urinal. The system similarly comprises a flushing valve of the pilot-operated self-closing type having a pilot-operated pressure chamber in communication with a pilot passage controlled by a solenoid valve of the non-latching type signaled by a control unit responsive to a sensor for detecting the user of the urinal. In this form, a pressure control valve is disposed upstream of the flushing valve to reduce the total pressure delivered to the solenoid valve. Upon sensing the use of the urinal, the electric control unit energizes the solenoid valve for a predetermined period of time. As the dynamic pressure of water flowing through the flushing valve is controlled constant by the pressure control valve, a predetermined quantity of flushing water is delivered to the urinal regardless of any pressure variation that may occur in the water supply system. Therefore, the flushing system is particularly advantageous in preventing any excessive discharge of flushing water and contributes to the conservation of water resources.

The flushing valve of the urinal may be periodically and intermittently operated for a short time to deliver a small amount of flushing water in the absence of the user. Such periodic operation is advantageous in resetting the secondary pressure to a lower level as well as in keeping the bowl surface of the urinal wet and clean when the urinal is not used for hours. Alternatively, the flushing valve may be operated for a short time when the static pressure detected by a pressure sensor exceeds a predetermined pressure level.

DESCRIPTION OF THE PREFERRED EMBODIMENTS

Figure 1A:
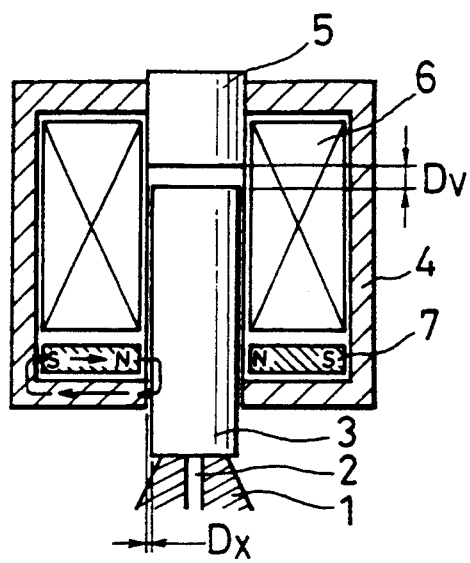
FIGS. 1A–1F are schematic views showing the sequence of operation of the conventional solenoid valve of the latching type.
Figure 1D:
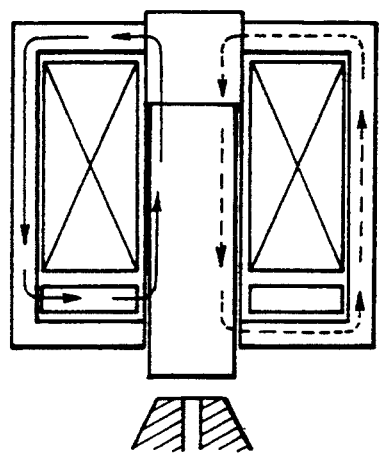
Figure 1B:
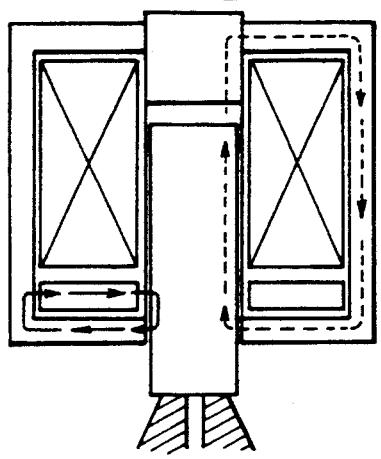
Figure 1E:
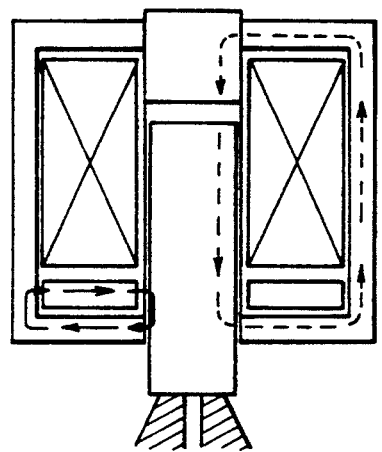
Figure 1C:
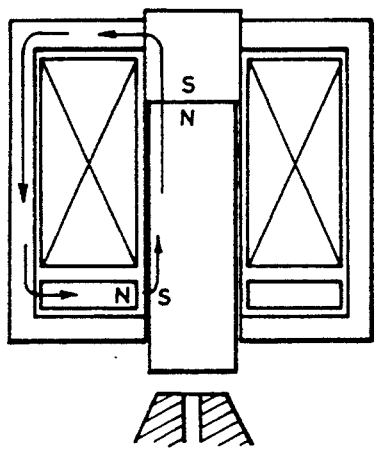
Figure 1F:
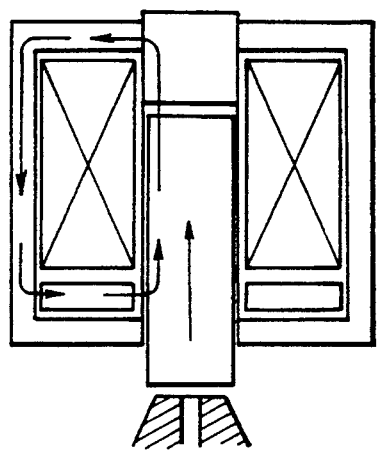
Figure 2:
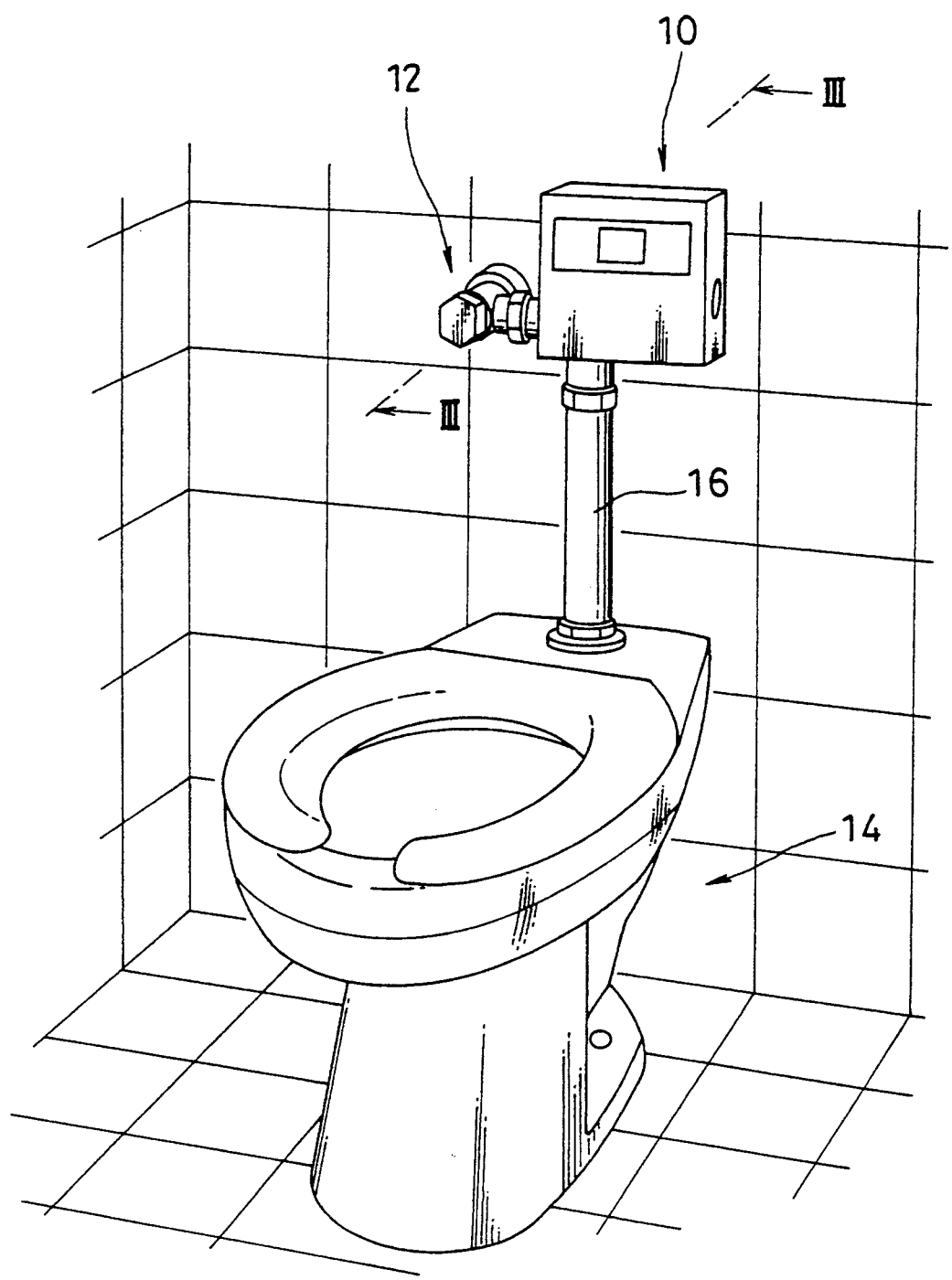
FIG. 2 is a perspective view showing the automatic flushing system according to the invention as installed in a toilet.
Figure 3:
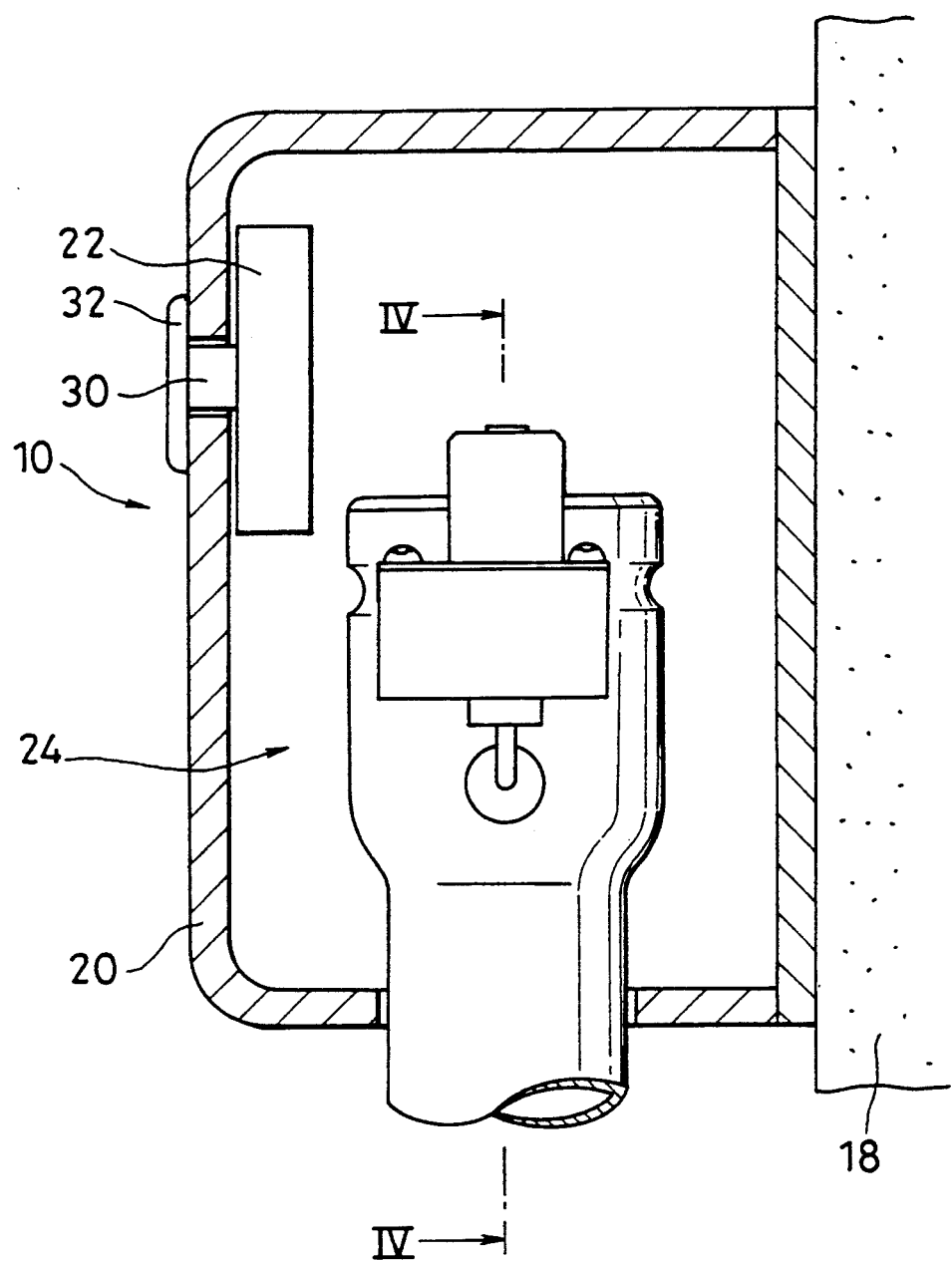
FIG. 3 is a cross-sectional view taken along the line III—III of FIG. 2.

By way of example, the first embodiment of the invention as applied to an automatic flushing system for a toilet will be described with reference to FIGS. 2–11. Referring to FIG. 2, the automatic flushing system 10 is connected through a conventional stop valve 12 to an existing water supply line, not shown, and is adapted to automatically deliver a quantity of flushing water to a conventional toilet fixture 14 via a flushing pipe 16 in response to the use of the toilet. As shown in FIG. 3, the flushing system 10 includes a housing 20 which is fixed to a wall 18 of the house or building and wherein a control box 22 and a flushing valve unit 24 are arranged. The control box 22 houses a set of batteries 26 and an electric control unit 28, shown only in FIG. 10, and is provided with a conventional sensor unit 30 for detecting the presence and absence of the user. The sensor unit 30 may comprise in a conventional manner an infrared light emitting diode adapted to issue infrared light toward the space above the toilet fixture and a photosensor adapted to detect the light reflected by the body of the user. The electric control unit 28 may comprise a programmed microcomputer and may be constructed and designed to operate as described and shown in a greater detail in U.S. Pat. No. 4,742,583, the disclosure of which is hereby incorporated by reference herein. Briefly, the control unit 28 cyclically operates the sensor unit 30 to cause it to issue the infrared light through a glass window 32 and monitors the light reflected by the user of the toilet. When the reflected light is sensed for a predetermined period meaning that the toilet is now in use and thereafter the light reflection is ceased meaning that the user has now left the toilet, the control unit judges that the use of the toilet is terminated and automatically operates the flushing valve.

Figure 4:
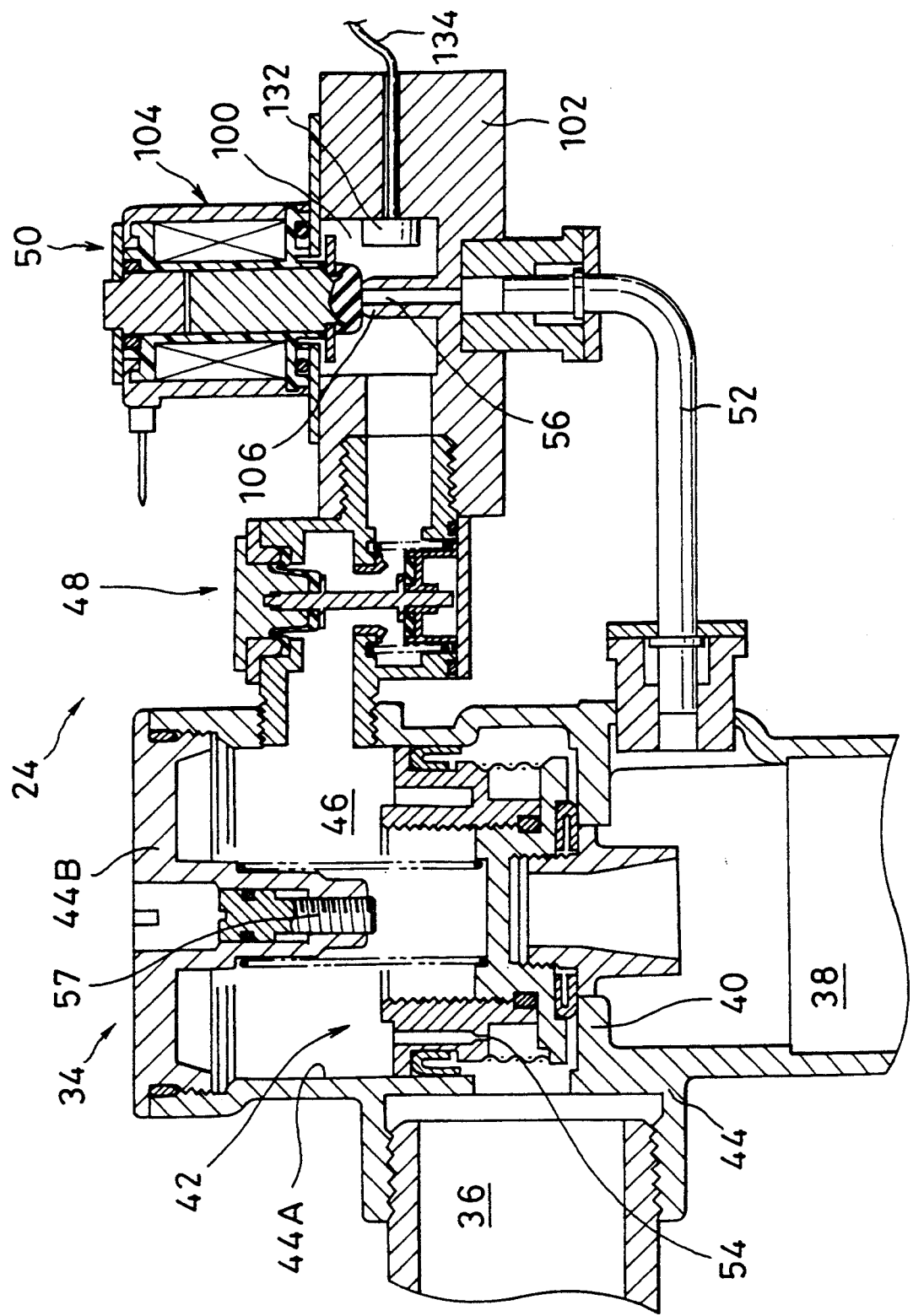
FIG. 4 is a cross-sectional view taken along the line IV—IV of FIG. 3.

Referring primarily to FIG. 4, the valve unit 24 includes a flushing valve 34 of the conventional pilot-operated self-closing type, having a water inlet 36 in communication with the stop valve 12 and a water outlet 38 connected to the flushing pipe 16. In the illustrated embodiment, the flushing valve 34 is provided with a piston valve 42 that cooperates with a valve seat 40 to control the flow of flushing water. As is well-known in the art, the piston valve 42 is slidably received in the bore 44A of the valve body 44 to define a pressure chamber 46. The pressure chamber 46 is connected through a pressure control valve 48 and a solenoid valve 50, described later, to a pilot conduit 50 leading to the outlet 38. Opening of the solenoid valve 50 will permit water in the pressure chamber 46 to be released therefrom causing the piston valve 42 to be lifted to deliver flushing water. As is well-known, the piston valve 42 is provided with a calibrated inlet port or orifice 54 which communicates the inlet 36 with the pressure chamber 46. Accordingly, when after operation of the flushing valve 34 the solenoid valve 50 is deenergized to close a pilot port 56 thereof, water under pressure will enter the pressure chamber 46 through the inlet port 54 at a limited flow rate thereby to pressurize the piston valve 42 causing it to gradually move downwards until it engages with the valve seat 40 to interrupt flow of flushing water. In this manner, the pressure chamber 46 serves to retard the closing movement of the flushing valve 34 to preclude water hammering from being generated in the water supply system. As is well-known, the diameter of the inlet port 54 is made smaller that the diameter of the pilot port 56 to ensure that the flow rate of water released from the pressure chamber 46 through the pilot port 56 is greater than the flow rate of water flowing into the pressure chamber through the inlet port 54. Therefore, upon energization of the solenoid valve 50, water pressure in the pressure chamber 46 will be reduced to trigger opening movement of the flushing valve 34. In this manner, the pressure chamber 46 also concerts with the solenoid valve 50 to pilot operate the flushing valve 34. The maximum stroke of the piston valve 42 is adjusted by a stop screw 57 screwed into a cover 44B of the valve housing 44.

Figure 5:
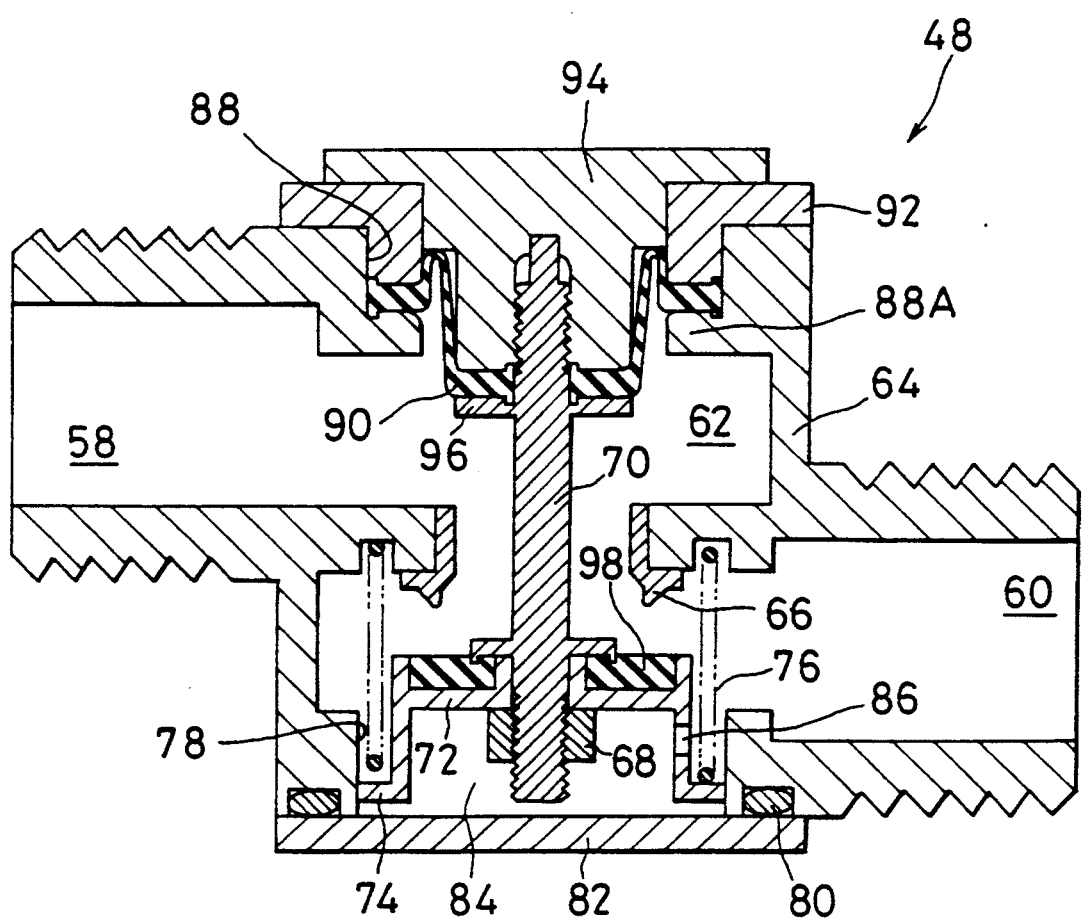
FIG. 5 is an enlarged cross-sectional view showing the pressure control valve of FIG. 4 in its free state prior to application of fluid pressure.
Figure 6:
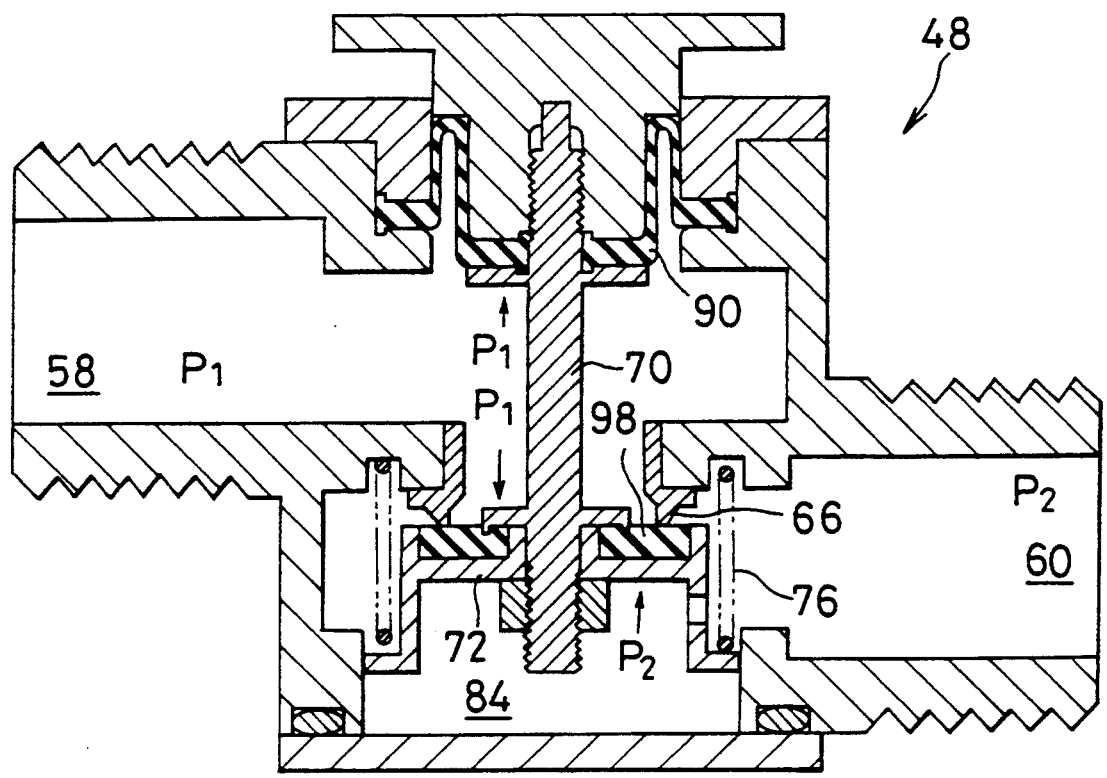
FIG. 6 is an enlarged cross-sectional view similar to FIG. 5 but showing the pressure control valve in its operative position, with its closure member contacted with the associated valve seat.

According to the invention, the pressure control valve 48 is disposed between the pressure chamber 46 and the solenoid valve 50 and is adapted to limit the water pressure delivered and applied to the solenoid valve 50 to 1 kgf/cm$^2$, for example. Referring to FIGS. 5 and 6, the pressure control valve 48 includes a body 64 having a water passage 62 extending therethrough between an inlet 58 and an outlet 60, a valve seat insert 66 being provided across the passage 62. The valve seat 66 is opened and closed by a movable closure member 72 fixed by a nut 68 to a valve shaft 70. As shown, the closure member 72 is disposed downstream of the valve seat 66. The closure member 72 is provided with an integral skirt portion 74 serving as a spring retainer receiving an end of a coil spring 76 that biases the closure member 72 away from the associated valve seat 66. The valve body 64 is provided with a bore 78 formed coaxially with the valve seat 66, in which bore the skirt 74 is slidably guided. After the closure member 72 as assembled with the valve shaft 70 is inserted within the valve body 64 with the spring 76 placed in position, a cover 82 is fluid tightly fastened to the body 64 by screws, not shown, with an O-ring 80 sandwiched therebetween. The closure member 72, the bore 78 and the cover 82 cooperate together to make up a secondary pressure chamber 84 of variable volume in which the secondary water pressure downstream of the valve seat 66 is reflected. To this end, the secondary pressure chamber 84 is communicated with the outlet 60 through an opening 86 formed in the skirt 74. Alternatively, the skirt 74 may be fitted within the bore 78 with a sufficient clearance therebetween so as to introduce the secondary pressure into the chamber 84.

At the upstream side of the valve seat 66, the valve body 64 is provided with a stepped bore 88 coaxial with the valve seat and defining a shoulder 88A on which the peripheral part of a pressure receptive member in the form of a diaphragm 90 is clamped by a retainer 92 suitably fastened to the valve body 64. The diaphragm 90 is intended to receive and respond to the primary water pressure at the inlet 58 and is designed to present an effective pressure receptive area equal to the effective cross-sectional area of the valve seat 66. Accordingly, in the closed position shown in FIG. 6, the hydraulic force acting on the closure member 72 due to the primary pressure at the inlet 58 will be equal to the hydraulic force acting in the opposite direction on the diaphragm 90 due to the same primary pressure. As shown, the central part of the diaphragm 90 is fluid tightly clamped against a flange 96 formed integral with the valve shaft 70 by means of a movable guide member 94 screwed onto the shaft 70. The guide member 94 is axially slidably received in the retainer 92 to axially guide the upper part of the valve shaft 70 as the diaphragm 90 is flexed in response to the displacement of the shaft 70, in order to prevent the diaphragm 90 from any damage due to local stress.

Figure 7:
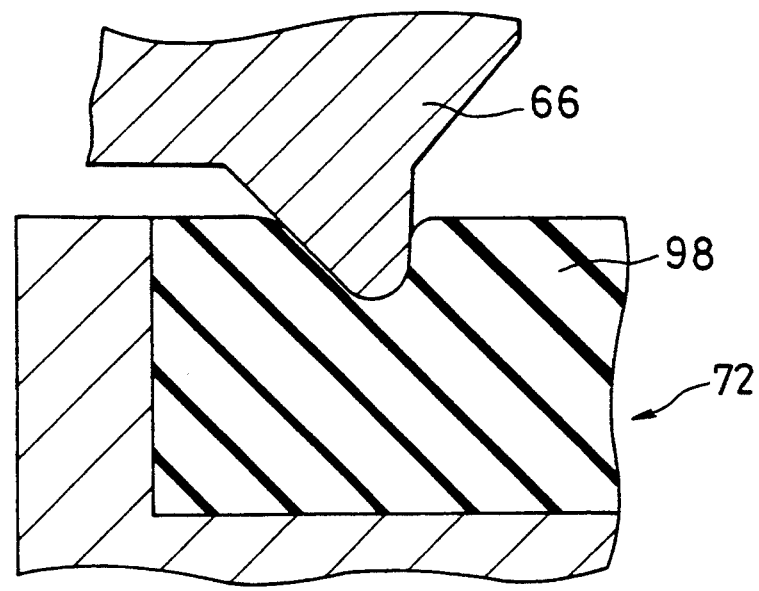
FIG. 7 is an enlarged cross-sectional view, partly cut away, showing part of the pressure control valve shown in FIG. 6.

As best shown in FIG. 7, the movable closure member 72 is provided, at the upper part thereof facing the valve seat 66, with a resilient sealing member 98 made of an elastomeric material adapted to resiliently engage with the valve seat 66.

To describe the operation of the pressure control valve 48 primarily with reference to FIG. 6, when the resilient sealing member 98 of the closure member 72 is in contact with the valve seat 66 as shown, the incoming primary pressure P1 at the inlet 58 acts upwardly on the diaphragm 90 and downwards on the closure member 72. Since the effective pressure receptive area of the diaphragm 90 is equal to the effective cross-sectional area of the valve seat 66 as mentioned hereinbefore, the hydraulic force that the diaphragm 90 receives from the primary pressure is equal to hydraulic force that the closure member 72 receives from the same primary pressure so that these forces acting in the opposite directions through the valve shaft 70 will be counterbalanced. Therefore, the pressure control valve 48 is free from the influence of the primary pressure.

The closure member 72, however, is subjected to the secondary pressure P2 existing downstream of the valve seat 66 and reflected in the secondary pressure chamber 84. This pressure P2 acts on the closure member 72 for the effective cross-sectional area of the valve seat 66 to exert an upwardly directed hydraulic force on the closure member 72. The closure member 72 is also subjected to the downwardly directed mechanical force due to the bias spring 76. Accordingly, the position of the closure member 72 will be dictated primarily by the balance between the hydraulic and mechanical forces. When the resilient sealing member 98 of the closure member 72 is just brought into contact with the valve seat 66 as shown in FIG. 6, the secondary pressure P2 will be determined only by the spring bias of the coil spring 76. As long as the secondary pressure P2 is lower than a pressure level determined by the spring force of the bias spring 76, the spring bias acting on the closure member 72 will overcome the hydraulic force acting on the closure member 72 due to the water pressure in the secondary pressure chamber 84, so that water under pressure is allowed to flow downstream of the valve seat 66 thereby permitting pressure rise of the secondary pressure P2.

As the secondary pressure P2 becomes higher than the pressure level dictated by the spring 76, the hydraulic force acting on the closure member 72 due to the pressure in the secondary pressure chamber 84 will overcome the force of the spring 76 and will begin to urge the closure member 72 against the valve seat 66. As the secondary pressure P2 increases further, the closure member 72 will be urged against the valve seat 66 with an increasing hydraulic force causing the resilient sealing member 98 to be resiliently compressed against the valve seat 66 with an increasing degree of elastic deformation as shown in FIG. 7. As the elastic deformation proceeds, the closure member 72 will undergo an increasing counteractive force proportional to the degree of elastic deformation of the resilient sealing member 98. When, finally, the hydraulic force acting on the closure member 72 due to the secondary pressure in the secondary pressure chamber 84 becomes equal to the sum of the spring force exerted on the closure member by the bias spring 76 and the counteractive force of elastic deformation exerted on the closure member by resilient compression of the sealing member 98, the flow of water flowing through the valve seat 66 will be shut off. At this stage, the valve seat 66 will be deeply engaged into the sealing member 98 under substantial stress as shown in FIG. 7 to fluid tightly seal the valve seat 66. Although the secondary pressure presents a slight hysteresis, the pressure control vale 48 is able in this manner to shut off the primary pressure with a high degree of sealing capability so as to prevent leakage of water at the valve seat. In this way, the pressure control valve 48 not only controls the dynamic secondary pressure P2 when the flow of water is flowing through the valve seat 66, but also functions to control and limit the static secondary pressure P2 when the flow of water is shut off in such a manner as to preclude any subsequent pressure rise and to limit the static secondary pressure to a predetermined pressure level. The spring constant of the bias spring 76 and the elasticity of the resilient sealing member 98 may be selected such that the static secondary pressure is limited, for example, to 1 $kgf/cm^2$.

Referring again to FIG. 4, the water pressure in the pressure chamber 46 of the flushing valve 34 is applied to the solenoid valve 50 after being reduced in the foregoing manner by the pressure control valve 48. The solenoid valve 50 includes a base 102 having a valve chamber 100 and a solenoid actuator 104 fluid tightly secured to the base 102. The base 102 is provided with a valve seat 106 projecting into the valve chamber 100 and having the pilot port 56 communicated with the pilot conduit 52.

Figure 8:
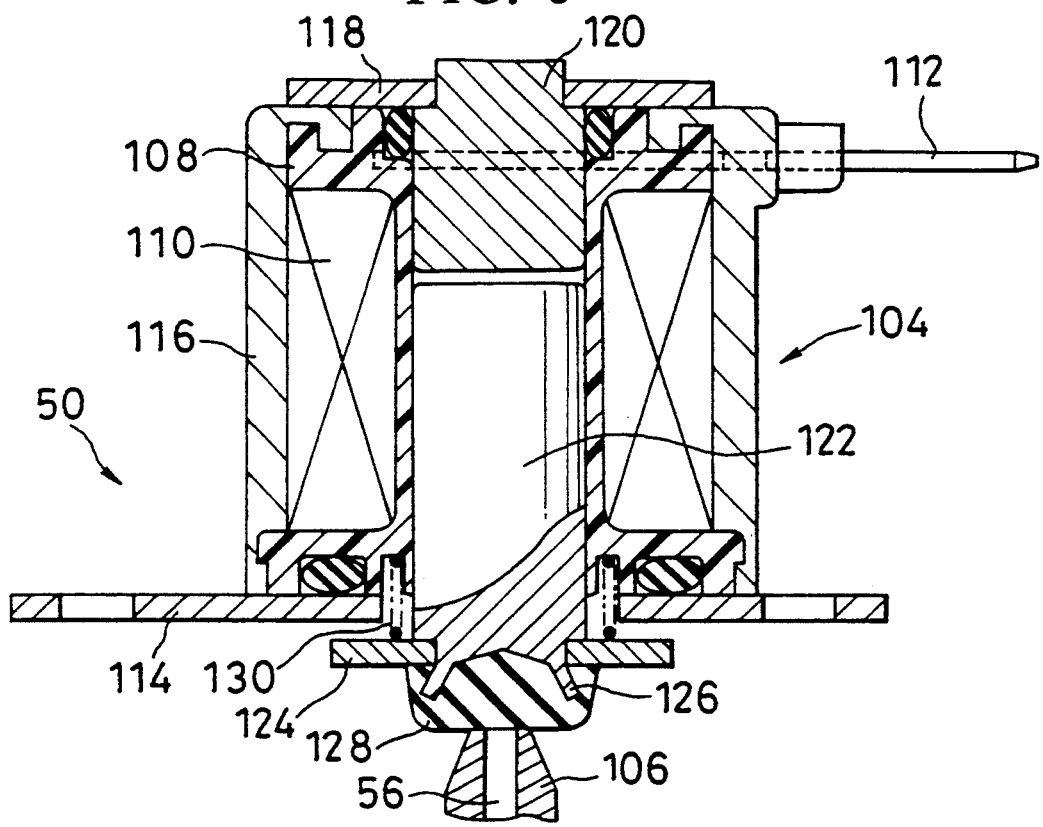
FIG. 8 is an enlarged cross-sectional view showing the solenoid valve of FIG. 4 in its fully closed position.
Figure 9:
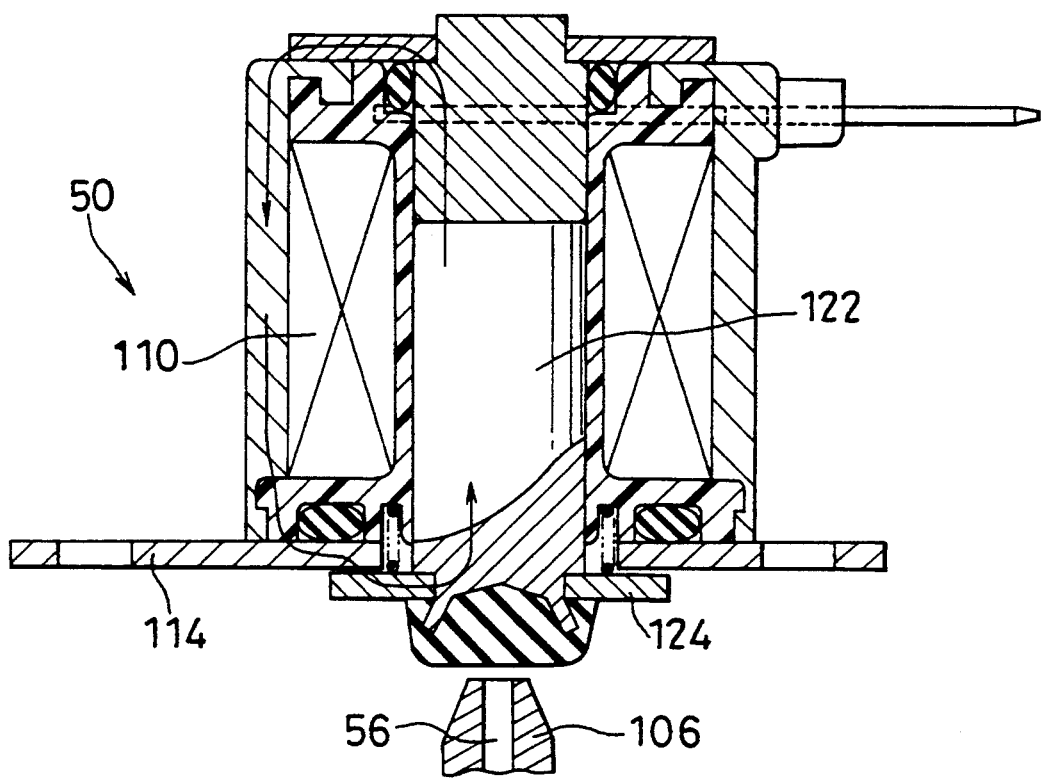
FIG. 9 is an enlarged cross-sectional view similar to FIG. 8 but showing the solenoid valve in its fully open position.

As best shown in FIGS. 8 and 9, the pilot-operating solenoid valve 50 is of the non-latching type which is designed to be held in its open position only when the electric power is supplied. A bobbin 108 of plastics has a solenoid windings 110 having a terminal 112 connected to the electric control unit 28 shown in FIG. 10. The solenoid valve 50 further includes a base plate 114, a housing 116 and an end plate 118, of a ferromagnetic metal, which are rigidly secured with each other to form a magnetic yoke in the well-known manner. The end plate 118 supports a magnetic pole piece 120 which is aligned with a plunger 122 slidably received in the bobbin 108. A flange piece 124 of ferromagnetic material is fitted at the lower end of the plunger 122 and is secured in position by crimping pawls 126 integral with the plunger. The plunger 122 is provided with an elastomeric sealing member 128 which is bonded to the lower end of the plunger and which is adapted to resiliently engage the valve seat 106 to fluid tightly close the pilot port 56. In the illustrated embodiment, a return spring 130 is provided to bias the plunger 122 toward the valve seat 106. However, the spring 130 is not indispensable because in the closed position the plunger 122 will be urged against the valve seat by the gravity and the hydraulic pressure.

The axial distance existing in the closed position shown in FIG. 8 between the flange piece 124 and the base plate 114 is made slightly larger than the stroke of the plunger 122 to ensure that the plunger 122 moves through its full stroke until it abuts against the magnetic pole piece 120 regardless of the presence of possible manufacturing tolerances of parts.

The pilot-operating solenoid valve 50 is controlled by the electric control unit 28 in a manner described in U.S. Pat. No. 4,742,583. As termination of the use of the toilet is sensed, the control unit 28 automatically energizes the solenoid coil 110 whereupon the plunger 122 will be attracted against the pole piece 120 to open the pilot port 56 as shown in FIG. 9. In this regard, it will be understood that, in the closed position of the solenoid valve 50 shown in FIG. 8, the valve chamber 100 is subjected to the static secondary pressure P2, while the pilot port 56 is under the atmospheric pressure since it is communicated with the outlet 38 of the flushing valve 34. Therefore, the plunger 122 undergoes the hydraulic force due to the secondary pressure P2 in the valve chamber 100 acting for the effective cross-sectional area of the pilot port 56. The plunger 122 is also subjected to the force of gravity and the bias force of the spring 130. Accordingly, energization of the solenoid coil 110 must be made by an electric current having such an intensity enough to attract the plunger 122 against the action of these forces. It will be understood, however, that, as the static secondary pressure P2 prevailing in the valve chamber 100 has been reduced and limited by the pressure control valve 48 to 1 kgf/cm$^2$ as described before, a supply of electric power of about 50 mA for about 0.1 second will be sufficient to lift the plunger 122 away from the valve seat 106.

When the plunger 122 is once attracted against the magnetic pole piece 120 as shown in FIG. 9, the flange piece 124 of ferromagnetic material will be brought close to the base plate 114 so as to form a magnetic path shown by the arrows. As shown, the radial magnetic gap existing between the base plate 114 and the plunger 122 is by-passed and short-circuited by the flange piece 124 which serves to magnetically bridge and couple the base plate 114 and plunger 122 with each other. As a result, the magnetic resistance of the magnetic path is considerably reduced. Accordingly, the plunger 122 can be held attracted to the pole piece 120 and be maintained in its open position only by limited electric power which may be in the order of 5 mA.

Energization of the solenoid valve 50 may be continued for about 5 seconds, for example, until the piston valve 42 moving on its upward stroke abuts against the stop screw 57 while commencing supply of flushing water to the toilet bowl. As the control unit 28 ceases energization of the solenoid valve 50 to terminate release of pressure from the pressure chamber 46, the piston valve 42 will be gradually lowered due to increasing pressure in the pressure chamber 46 caused by water flowing therein through the orifice 54 until the piston valve 42 engages the valve seat 40 to terminate the supply of flushing water.

According to this embodiment, in this manner, the energy consumption required to raise the plunger 122 of the solenoid valve 50 can be reduced because the static water pressure applied thereto is limited by the pressure control valve 48. In addition, the power consumption required to maintain the plunger in its raised open position can be minimized due to the provision of the flange piece 124 short-circuiting the magnetic gap. In total, the energy consumption required per cycle of operation of the automatic flushing system 10 can be reduced. Where the system is designed such that the water supply pressure is reduced by the pressure control valve 48 down to about 1 kgf/cm$^2$, that the solenoid coil 110 is energized for about 0.1 second at an electric current in the order of 50 mA at the time of initiating the upward stroke of the plunger 122, and that the solenoid coil is thereafter energized for about 5 seconds at an electric current of about 5 mA to maintain the solenoid valve 50 in its open position, it will be possible to operate the automatic flushing system 10 for more than 2 years at a rate of 4,000 times of use per month, even in the case that it is powered only by four of the standard UM-3 dry cells such as manganese or alkaline batteries which are readily available on the market.

Figure 10:
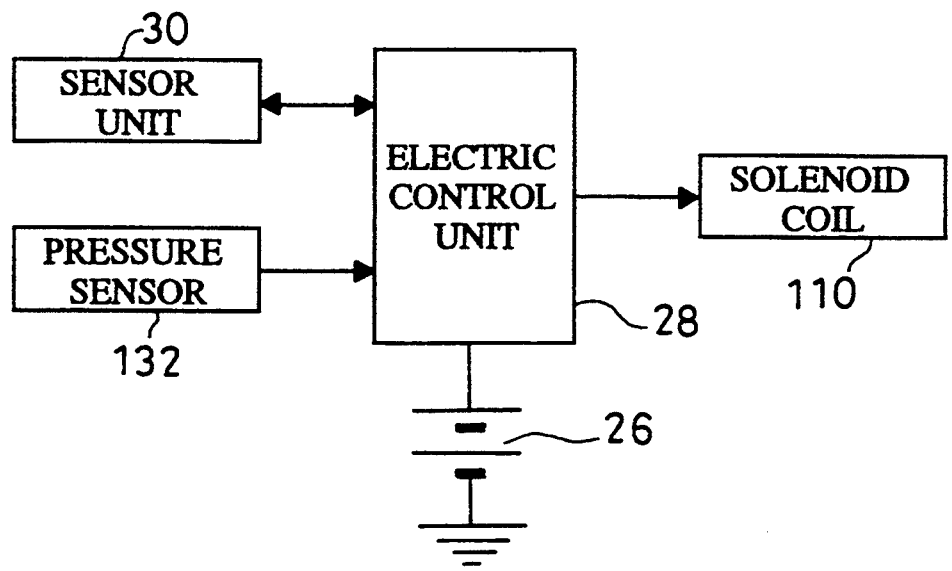
FIG. 10 is a block diagram showing the electric control unit of the flushing system as connected to the associated components.
Figure 11:
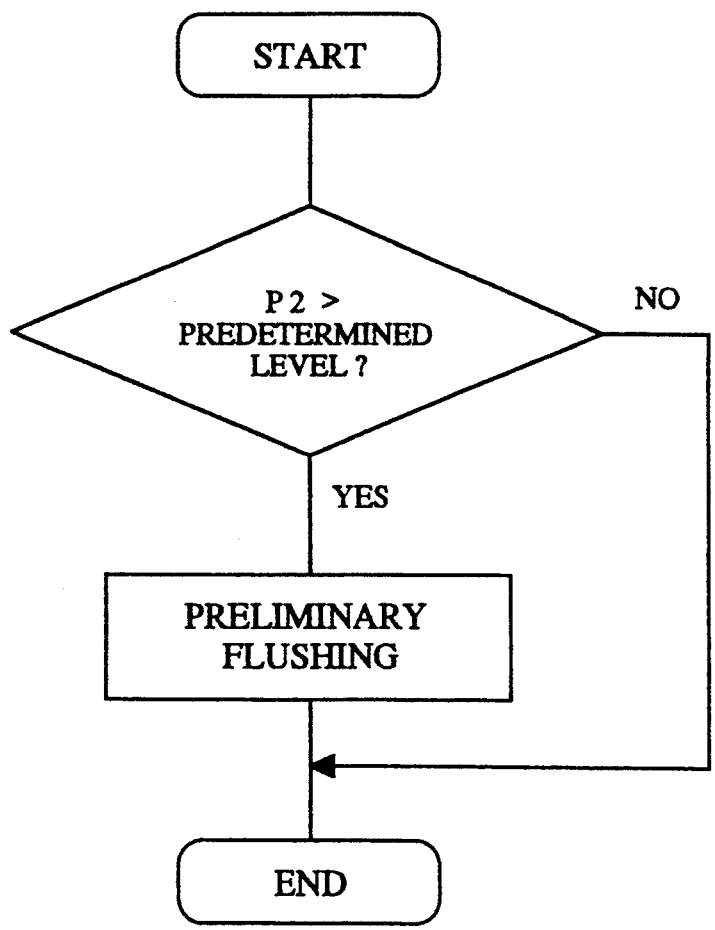
FIG. 11 is a flowchart showing an example of the function performed by the electric control unit to reset the secondary pressure.

During use of the flushing system 10 for a prolonged period, the capability of the pressure control valve 48 to shut-off the static pressure downstream of the valve seat 66 might be lowered due to degradation of the resilient sealing member 98 and because of dusts and deposits adhering to the valve seat 66. This would result in the static water pressure applied to the solenoid valve 50 being inadvertently increased when the flushing system is not used for hours. To avoid this, a pressure sensor 132 of the conventional type is preferably arranged in the valve chamber 100 of the solenoid valve 50 as shown in FIG. 4. The output from the pressure sensor 132 is forwarded through a lead wire 134 to the electric control unit 28 as shown in FIG. 10 to enable the control unit 28 to monitor the static pressure in the valve chamber 100. The control unit 28 cyclically performs the function shown in the flowchart of FIG. 11 to see if the static secondary pressure detected by the pressure sensor 132 exceeds a predetermined level. If this is the case, the control unit 28 preliminarily energizes the solenoid valve 50 for a short period ranging from one to two seconds, for example. Such preliminary actuation of the solenoid valve 50 will be sufficient to reset the static secondary pressure prevailing in the valve chamber 100 back to the initial level. Operation of the solenoid valve 50 will also permit the flushing valve 34 to deliver a small amount of flushing water which advantageously will serve to keep the bowl surface of the toilet wet and clean even though the toilet remains unused for hours. The duration of energization of the solenoid valve may be selected such that 2 liters of flushing water is supplied in the absence of the user. Instead of using the pressure sensor 132, the control unit 28 may be programmed to energize the solenoid valve 50 for every several hours thereby to periodically reset the static pressure and carry out such preliminary flushing.

Figure 12:
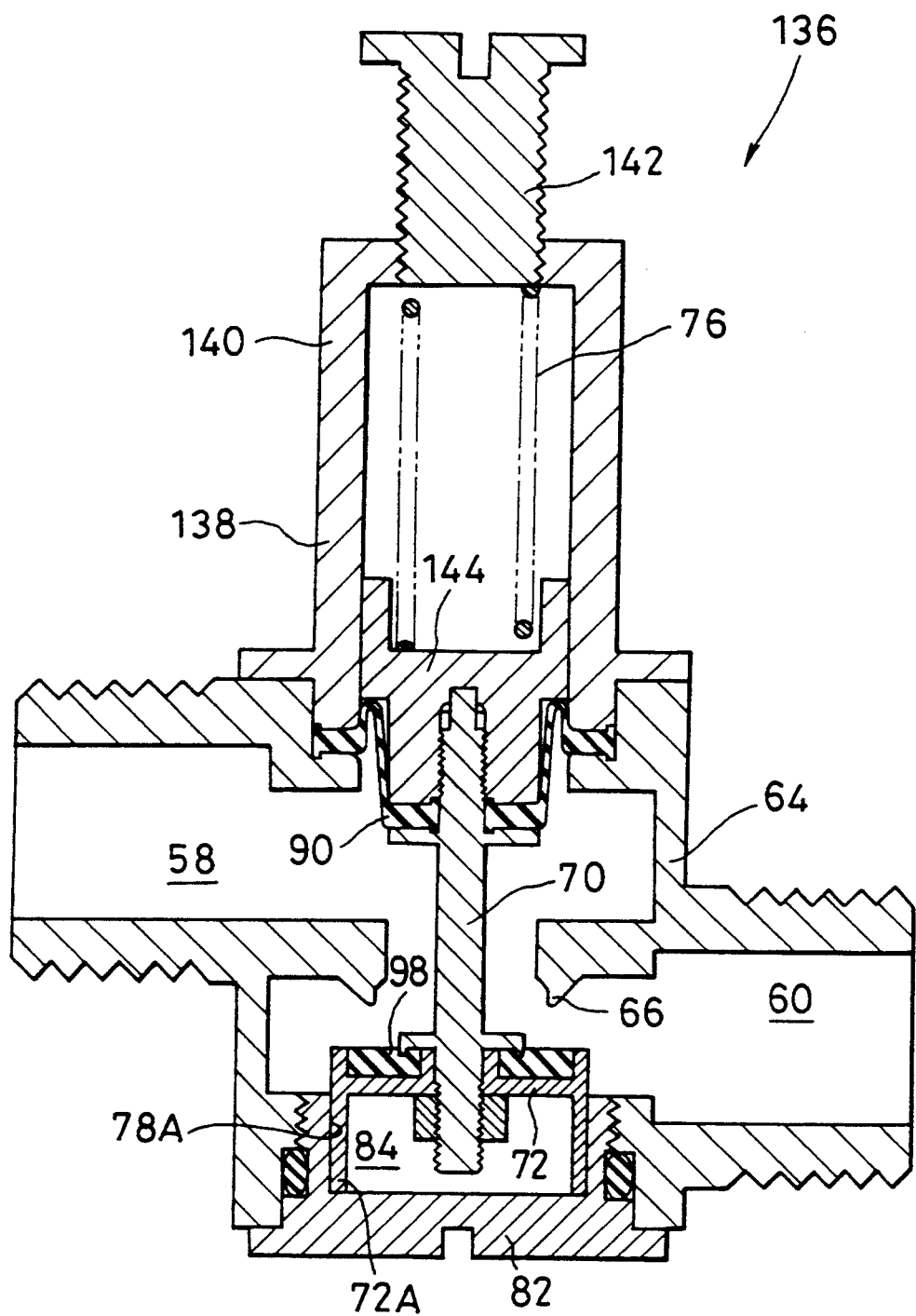
FIG. 12 is an enlarged cross-sectional view showing a modified form of the pressure control valve.

In FIG. 12, there is shown a modified form of the pressure control valve 48 described hereinbefore with reference to FIGS. 5-7. Parts and members similar to those shown in FIGS. 5-7 are designated in FIG. 12 by like reference numerals and, for this reason, need not be described again. Only the difference will be described. The feature of the pressure control valve 136 shown in FIG. 12 is that the secondary pressure may be adjusted by varying the spring force of the bias spring. To this end, the retainer 138 for clamping the diaphragm 90 against the valve body 64 is provided with a tubular extension 140 in which an adjusting screw 142 is threadingly engaged. The movable guide member 144 which also serves to secure the diaphragm 90 to the valve shaft 70 is slidably guided by the tubular extension 140 of the retainer 139, with the compression spring 76 being arranged between the guide 144 and the adjusting screw 142. Accordingly, the movable guide member 144 serves to receive the spring force of the spring 76 in addition to its function to guide the diaphragm 90 during up and down movement of the valve shaft 70. The skirt portion 72A of the movable closure member 72 is clearance fitted within the bore 78A of the cover 82 so that the secondary pressure at the outlet 60 is reflected within the chamber 84. With this arrangement, rotation of the adjusting screw 142 in one or other direction will vary the preload of the bias spring 76 to permit adjustment of the secondary pressure. While this arrangement requires additional costs to manufacture and increases the overall dimension of the pressure control valve as compared with the structure shown in FIG. 5, it is advantageous in that the flow rate of the flushing valve can be adjusted according to varying demands.

Figure 13:
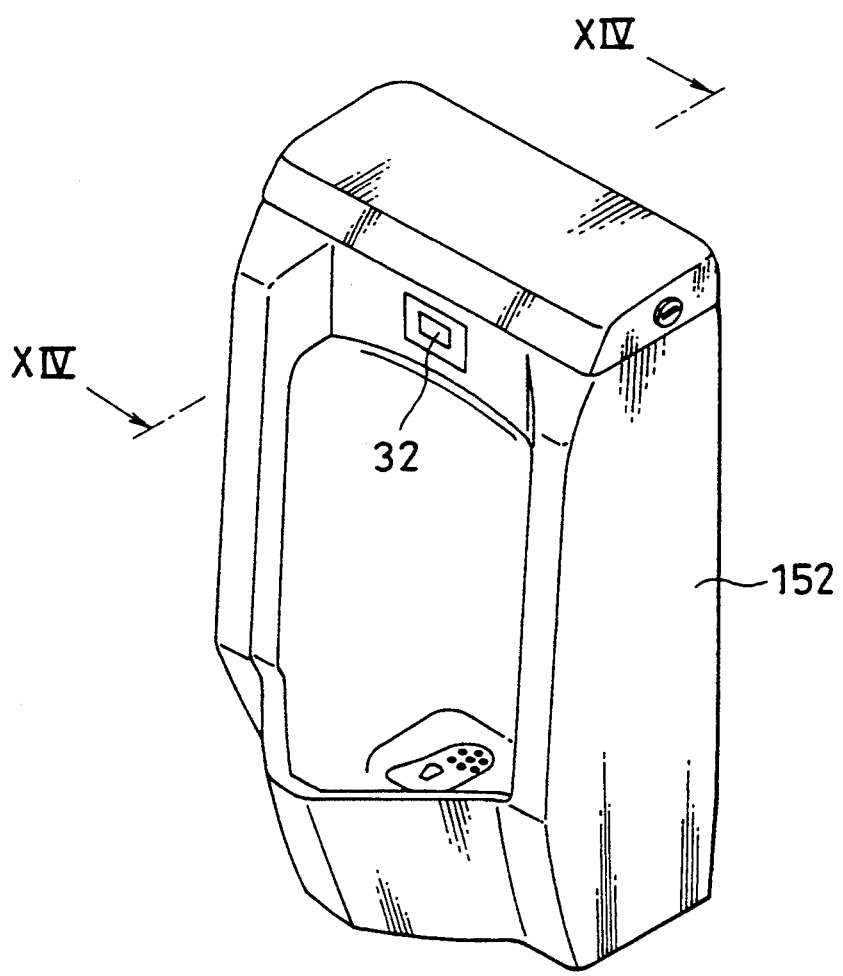
FIG. 13 is a perspective view showing a urinal equipped with an automatic flushing system according to the second embodiment of the invention.
Figure 14:
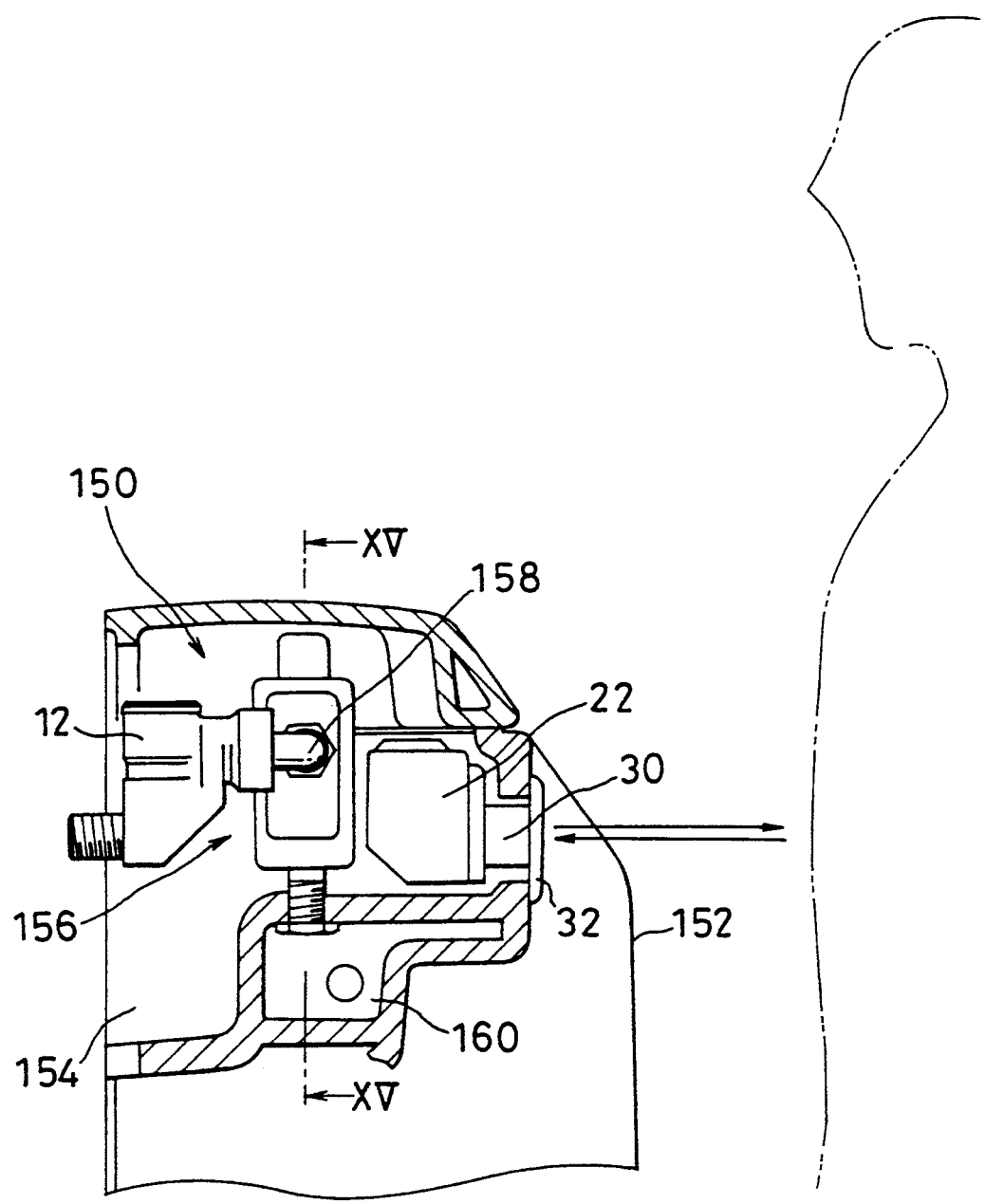
FIG. 14 is a cross-sectional view taken along the line XIV—XIV of FIG. 13.
Figure 15:
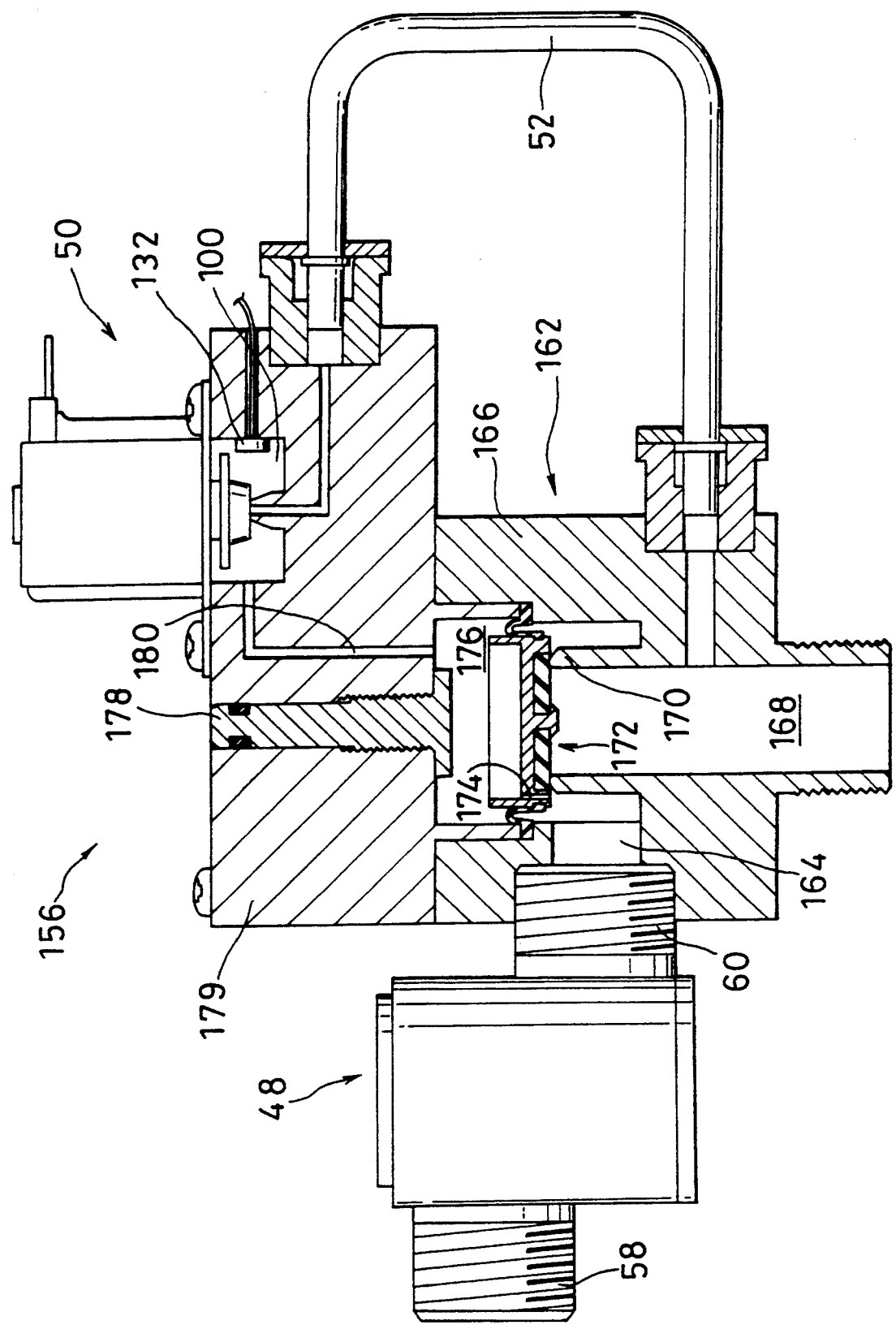
FIG. 15 is a cross-sectional view taken along the line XV—XV of FIG. 14.

FIGS. 13–15 illustrate the second embodiment of the invention as applied to an automatic flushing system for a urinal. The feature of the second embodiment is that the pressure control valve is disposed upstream of the pilot-operated self-closing flushing valve to ensure that the quantity of flushing water delivered per cycle of operation of the flushing system is made constant regardless of the variation in the water supply pressure. This feature is advantageous in achieving water saving as described later with reference to the graph of FIG. 16. In FIGS. 13–15, parts and members similar to those of the first embodiment shown in FIGS. 2–10 are designated by like reference numerals and, therefore, will not be described again.

Referring to FIGS. 13 and 14, the automatic flushing system 150 is installed in a compartment 154 formed in the upper part of a urinal 152 and is provided with a valve unit 156 and the control box 22. The inlet of the stop valve 12 may be connected in the well-known manner to a water supply pipe, not shown, the outlet thereof being connected through an elbow 158 to the valve unit 156. The electric control unit 28 of the control box 22 operates in a manner similar to the first embodiment. Thus, upon sensing termination of use of the urinal 152 based on the reflection of the infrared light issued from the sensor unit 30, the control unit 28 automatically actuates the valve unit 156. Flushing water from the valve unit 156 is delivered to the distribution channel 160 and flows therefrom along the bowl surface of the urinal fixture in a well-known manner.

Referring to FIG. 15, the valve unit 156 of the flushing system 150 includes a flushing valve 162 of the pilot-operated self-closing type. Connected upstream of the flushing valve 162 is the pressure control valve 48 which is identical to that described before with reference to FIGS. 5–7. Structure and operation of the pressure control valve 48 need not be described again. The inlet 58 of the pressure control valve 48 is connected to the elbow 158 which, in turn, is connected to the stop valve 12. The outlet 60 of the pressure control valve 48 is connected to an inlet 164 of the flushing valve 162 so as to reduce and limit the primary water pressure incoming from the water supply to the secondary pressure of a predetermined level and to deliver it to the inlet 164 of the flushing valve 162.

The flushing valve 162 is of the conventional type and is adapted to be operated by a pilot-operating solenoid valve and to be automatically closed after operation. In the embodiment illustrated in FIG. 15, the flushing valve 162 is provided with a diaphragm valve 172, in contrast to the flushing valve 34 of the first embodiment wherein the piston valve 42 is used. However, the function and operation of the diaphragm valve 172 are similar to those of the piston valve 42 and, accordingly, need not be described. The flushing valve 162 includes a valve body 166 having a valve seat 170 in communication with an outlet 168. The diaphragm valve 172 cooperates with the valve seat 170 to control flow of flushing water flowing from the inlet 164 to the outlet 168. Similar to the piston valve 42 of the first embodiment, the diaphragm valve 172 is provided with a calibrated orifice 174 to limit the flow rate of water flowing into the pressure chamber 176. The maximum stroke of the diaphragm valve 172 may be adjusted by an stop screw 178 threadingly engaged in a head block 179.

Similar to the first embodiment, the pressure chamber 176 of the flushing valve 62 is in communication with the outlet 168 through a pilot passage 180 and the pilot conduit 52 provided with the solenoid valve 50 of the non-latching type which is adapted to pilot-operate the flushing valve 162. The solenoid valve 50 is identical to that described before with reference to FIGS. 8–11 and is operated in the same manner.

Water from the water supply system is delivered to the inlet 164 of the flushing valve 162 after the pressure thereof has been reduced by the pressure control valve 48 to the secondary pressure of 1 kgf/cm$^2$, for example. In the closed position of the flushing valve 162, the static inlet pressure is applied through the orifice 174 to the pressure chamber 176 and is transmitted therefrom to the valve chamber 100 of the solenoid valve 50 via the pilot passage 180. As the static water pressure applied to the valve chamber 100 of the solenoid valve 50 is limited by the pressure control valve 48 similarly to the first embodiment, the plunger of the solenoid valve 50 will be subjected to a limited hydraulic force. Therefore, the solenoid valve 50 can be opened by supplying an electric current in the order of 50 mA to the solenoid coil thereof. Similar to the first embodiment, the solenoid valve 50 may be held in its open condition with a reduced electric current of about 5 mA. Accordingly, the flushing system 150 may be operated by a limited battery energy similarly to the first embodiment. In the event that during the prolonged use of the flushing system 150 the sealing capability of the pressure control valve 48 is degraded for reasons mentioned with reference to the first embodiment, the static pressure in the valve chamber 100 may similarly be reset periodically or in response to the pressure rise detected by the pressure sensor 132.

Figure 16:
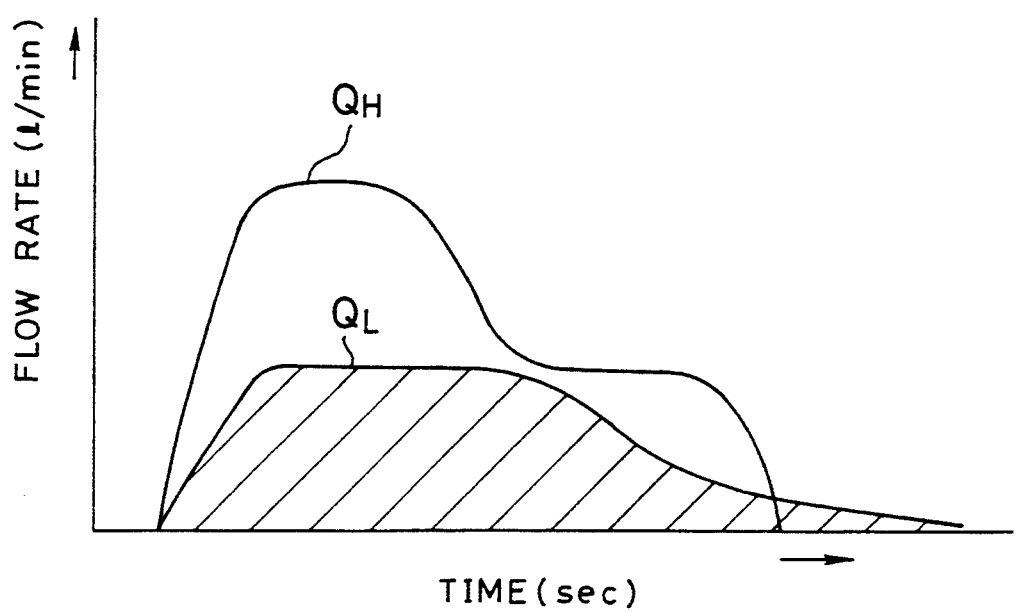
FIG. 16 is a graph illustrating the total amount of flushing water delivered at different water pressures.

The advantage of the second embodiment will be described with reference to the graph of FIG. 16 wherein there is shown the variation in the flow rate of flushing water delivered by a typical self-closing type flushing valve. In the graph, the ordinate represents the flow rate and the abscissa indicates the lapse of time. Generally, in a flushing valve of the pilot-operated self-closing type, such as the flushing valve 162, the time elapsed after the solenoid valve 50 has closed and until the diaphragm valve 172 is closed varies in accordance with the flow rate of water flowing through the orifice 174 into the pressure chamber 176, the flow rate, in turn, varying according to the water pressure at the inlet 164. Thus, the higher the inlet pressure is, the sooner the flushing valve is closed as shown by the curve $Q_H$ in the graph of FIG. 16. When the inlet pressure is lower, the closure of the flushing valve is retarded as shown by the curve $Q_L$. On the other hand, the instantaneous flow rate is proportional to a square root of the water pressure. In summary, the total quantity of flushing water per cycle of operation of the flushing valve is equal to the instantaneous flow rate as differentiated by the time. In FIG. 16, the total quantity of flushing water for the curve curve $Q_H$ is shown by the hatched area. It will be noted from the graph of FIG. 16 that the total quantity of flushing water per cycle of operation of the flushing valve varies according to the variation in the water supply pressure. In this regard, it is general that the pressure of water supply system varies from house to house and also varies from floor to floor of the same building. In addition, the supply pressure fluctuates during a day. Generally, the supply pressure varies from 2 to 10 kgf/cm². It will be therefore understood that the amount of flushing water per cycle of operation of the flushing system varies from system to system when the flushing system is fed with water of varying pressure. In the case that the flushing system is adjusted to deliver a desired amount of flushing water at a lower supply pressure as shown, for example, by the curve $Q_L$, the quantity of flushing water will become excessive when the supply pressure is increased. This would result in the loss of water resources. Conversely, if the flushing system is adjusted to deliver a desired amount of water at a higher supply pressure as shown, for example, by the curve $Q_H$, then the quantity of flushing water will be insufficient when the supply pressure is diminished.

According to the second embodiment of the invention, the pressure control valve 48 is arranged upstream of the flushing valve 162. In addition to its function of controlling the static pressure, the pressure control valve 48 is also operable to control the dynamic pressure constant, regardless of any pressure fluctuation in the water supply system. Therefore, the amount of flushing water per cycle of operation of the flushing valve 162 is unaffected by pressure variation in the water supply system. Accordingly, the flushing valve can be adjusted in such a manner as to deliver a desired minimum amount of water to achieve water saving.

While the present invention has been described herein with reference to the specific embodiments thereof as applied to the automatic flushing systems for toilet and urinal, it is contemplated that the invention is not limited thereby and various modifications and alterations may be made therein without departing from the scope of the invention. For example, the invention is equally applicable to the battery-operated automatic faucets having self-closing valves actuated by pilot-operating solenoid valves. In these applications, the solenoid valves may be energized upon sensing the presence of an object in the wash basins and sinks.

We claim:

1. A water flow control system comprising:
   (A) a conduit for water having an inlet and an outlet, said inlet being adapted to be connected to a source of water under a primary water pressure;
   (B) a solenoid valve of a non-latching type disposed in said conduit to control flow of water through said conduit;
   (C) a pressure control valve disposed in said conduit upstream of said solenoid valve for reducing the primary pressure and for delivering to said solenoid valve a flow of water under a secondary pressure having a predetermined pressure level generally lower than the primary pressure at said inlet, said control valve comprising:
      a housing defining a water passage therethrough;
      a valve seat provided in said housing across said passage;
      a movable closure member disposed in said housing downstream of said valve seat and cooperating with said valve seat to control flow of water through said passage;...
      a pressure receptive member disposed in said housing upstream of said valve seat for receiving and responding to the primary pressure at said inlet, said pressure receptive member being coupled to said closure member; and
      spring means for biasing said closure member away from said valve seat;
      means for adjustably varying the spring force of said spring means;
      said closure member and said pressure receptive member being arranged so as to be subjected to the primary pressure in opposite directions so that the hydraulic forces acting thereon due to the primary pressure are substantially counterbalanced;
      said closure member being responsive to the secondary pressure so as to be biased toward said valve seat;
      said predetermined pressure level being determined in accordance with the spring force said spring means; and
   (D) electric control means for controlling said solenoid valve, said electric control means being operable to energize said solenoid valve with an electric current having a first intensity when the opening movement of said solenoid valve is to be initiated and being operable to energize said solenoid valve with an electric current having a second intensity lower than said first intensity when said solenoid valve is to be maintained in its open state.

2. A battery-operated water flow control system comprising:
   a pilot-operated self-closing valve having a water inlet adapted to be connected to a source of water under pressure and a water outlet, said valve having a pilot-operated pressure chamber for initiating the opening movement thereof and for retarding the closing movement thereof;
   a pilot passage connected to said pressure chamber for releasing water pressure from said pressure chamber;
   a battery-operated solenoid valve of the non-latching type disposed in said pilot passage to control release of pressure through said passage;
   pressure control means disposed in said pilot passage between said pressure chamber and said solenoid valve for limiting the static water pressure applied from said pressure chamber to said solenoid valve when the solenoid valve is closed to a predetermined pressure level generally lower than the pressure at said water inlet; and,
   electric control means for controlling said solenoid valve, said electric control means being operable to energize said solenoid valve with an electric current having a first intensity when the opening movement of said solenoid valve is to be initiated and being operable to energize said solenoid valve with an electric current having a second intensity lower than said first intensity when said solenoid valve is maintained in its open state.

3. A flushing system comprising:

a flushing valve having a water inlet adapted to be connected to a source of water under pressure and a water outlet, said flushing valve being of the pilot-operated self-closing type having a pilot-operated pressure chamber for initiating the opening movement thereof and for retarding the closing movement thereof;

a pilot passage connected to said pressure chamber for releasing water pressure from said pressure chamber;

a solenoid valve of the non-latching type disposed in said pilot passage to control release of pressure through said passage;

pressure control means disposed in said pilot passage between said pressure chamber and said solenoid valve for limiting the static water pressure applied from said pressure chamber to said solenoid valve when the solenoid valve is closed to a predetermined pressure level generally lower than the pressure at said water inlet; and, electric control means for controlling said solenoid valve, said electric control means being operable to energize said solenoid valve with an electric current having a first intensity when the opening movement of said solenoid valve is to be initiated and being operable to energize said solenoid valve with an electric current having a second intensity lower than said first intensity when said solenoid valve is maintained in its open state.

4. A flushing system according to claim 3, wherein, for automatic flushing, said system further comprises sensing means for detecting the use of a toilet or urinal with which said flushing system is associated, said electric control means being responsive to said sensing means to energize said solenoid valve upon termination of the use of said toilet or urinal to deliver thereto a predetermined quantity of flushing water.

5. A flushing system according to claim 3, wherein said system further comprises pressure detection means for monitoring the static water pressure applied from said pressure chamber to said solenoid valve when the solenoid valve is closed, said electric control means being responsive to said pressure detection means to energize said solenoid valve for a predetermined period of time whenever said static pressure exceeds said predetermined pressure level thereby to reset the static pressure.

6. A flushing system according to claim 3, wherein said electric control means is operable to periodically energize said solenoid valve for a predetermined period of time in order to periodically reset the static pressure applied from said pressure chamber to said solenoid valve.

7. A flushing system according to claim 3, wherein said pressure control means includes:

a housing defining a water passage therethrough;

a valve seat provided in said housing across said passage;

a movable closure member disposed in said housing downstream of said valve seat and cooperating with said valve seat to control flow of water through said passage;

a pressure receptive member disposed in said housing upstream of said valve seat for receiving and responding to the pressure from said pressure chamber, said pressure receptive member being coupled to said closure member; and, spring means for biasing said closure member away from said valve seat;

said closure member and said pressure receptive member being arranged so as to be subjected to a primary pressure from said pressure chamber in opposite directions so that the hydraulic forces acting thereon due to said primary pressure are substantially counterbalanced;

said closure member being responsive to a secondary pressure downstream of said valve seat so as to be biased toward said valve seat;

said predetermined pressure level being determined in accordance with the spring force of said spring means.

* * * * *